United States Patent
Musil et al.

(10) Patent No.: US 9,951,484 B2
(45) Date of Patent: Apr. 24, 2018

(54) POSITIONING ASSEMBLY FOR PLACING STEERABLE DRIVE IN MULTIPLE POSITIONS WITH RESPECT TO MILLING MACHINE HOUSING

(71) Applicant: Roadtec, Inc., Chattanooga, TN (US)

(72) Inventors: Joseph E. Musil, Ely, IA (US); James H. Bevill, Lookout Mountain, GA (US)

(73) Assignee: Roadtec, Inc., Chattanooga, TN (US)

(*) Notice: Subject to any disclaimer, the term of this patent is extended or adjusted under 35 U.S.C. 154(b) by 121 days.

(21) Appl. No.: 15/187,146

(22) Filed: Jun. 20, 2016

(65) Prior Publication Data
US 2017/0362782 A1    Dec. 21, 2017

(51) Int. Cl.
*E01C 23/088* (2006.01)
*E01C 23/12* (2006.01)
*B60G 3/01* (2006.01)
*B60B 35/10* (2006.01)

(52) U.S. Cl.
CPC ............ *E01C 23/088* (2013.01); *B60B 35/10* (2013.01); *B60B 35/1018* (2013.01); *B60G 3/01* (2013.01); *E01C 23/127* (2013.01); *B60G 2204/46* (2013.01); *B60G 2204/4604* (2013.01); *B60G 2300/09* (2013.01); *B60G 2300/40* (2013.01)

(58) Field of Classification Search
CPC . E01C 23/127; E01C 23/088; B60G 2300/37; B60G 2300/09; B60G 2300/40
See application file for complete search history.

(56) References Cited

U.S. PATENT DOCUMENTS

| | | | | |
|---|---|---|---|---|
| 6,106,073 A * | 8/2000 | Simons | ................. | E01C 23/088 180/209 |
| 6,173,512 B1 * | 1/2001 | Bitelli | ................... | E01C 23/088 299/39.6 |
| 6,705,798 B2 * | 3/2004 | Dubay | ................... | E01C 19/00 180/209 |
| 7,140,693 B2 * | 11/2006 | Dubay | ..................... | B60G 3/01 180/209 |
| 7,331,636 B2 * | 2/2008 | Troudt | ................... | B24B 7/188 299/39.4 |
| 8,297,876 B2 * | 10/2012 | Wagner | ................. | E01C 23/088 180/209 |
| 9,068,303 B2 * | 6/2015 | Berning | ................ | E01C 23/127 |
| 2006/0024134 A1 * | 2/2006 | Rio | ....................... | E01C 23/088 404/94 |

* cited by examiner

Primary Examiner — John J Kreck
Assistant Examiner — Michael A Goodwin
(74) Attorney, Agent, or Firm — Chambliss, Bahner & Stophel, P.C.

(57) ABSTRACT

A milling machine includes a frame, a housing, a milling drum mounted on the frame within the housing and a drive assembly. A positioning assembly is provided for moving the drive assembly between a first position which is laterally outside the periphery of the machine housing and a second position which is laterally inside the periphery of the machine housing, and for locking the drive assembly in at least the first and second positions without requiring the operator to manually manipulate a locking pin.

10 Claims, 14 Drawing Sheets

POSITIONING ASSEMBLY FOR PLACING STEERABLE DRIVE IN MULTIPLE POSITIONS WITH RESPECT TO MILLING MACHINE HOUSING

FIELD OF THE INVENTION

This invention relates generally to an assembly for positioning a steerable track or wheel drive assembly that is part of a milling machine in two or more positions, one of which locates the drive assembly laterally outside the periphery of the housing of the milling machine, and another of which locates the drive assembly laterally inside the housing of the machine. A preferred embodiment of the invention is used to move a steerable, rear drive assembly of a milling machine between a first position that is laterally outside the periphery of the housing of the machine and a second position that is inside the periphery of the machine housing.

BACKGROUND AND DESCRIPTION OF THE PRIOR ART

Roadway repair is often accomplished by overlaying the existing pavement (whether of concrete or asphalt composition) with a new layer (often called a leveling course) of concrete, asphalt or other surfacing materials. Without prior surface treatment, however, this method of repair generally results in the application of insufficient quantities of paving material in the rutted, potholed or otherwise damaged areas, because the overlay will be applied at the same rate per unit of roadway width in damaged areas (which have a greater depth across the width) as in the undamaged areas. The resulting reduced density in the overlay of the previously damaged areas will lead to renewed rutting or other wear damage in the new pavement in relatively short order. However, by milling the surface of the damaged pavement to a uniform surface elevation, the damaged areas will be removed so that newly added pavement will produce a road surface having a consistent elevation across the entire width of the roadway. This repaving technique can be used to return the elevation of a damaged roadway to its original pre-damaged elevation, whereas the placement of a leveling course atop damaged but unmilled pavement will tend to raise the surface of the roadway or some portion thereof above its original elevation. Roadway repair without milling can require the raising of road shoulders, guardrails and manhole covers and the adjustment of overpass clearances, all of which is unnecessary if a proper milling technique is employed. A use of milling prior to repaving can also penult ready establishment of the proper road grade and slope, and thereby avoid drainage and safety problems. Furthermore, milling typically provides a rough surface that readily accepts and bonds with the new asphalt or other pavement overlay. Finally, milling can provide raw material that can be reclaimed for use in the production of new paving materials.

A milling machine is typically a wheeled or track-driven vehicle that is provided with a rotating drum that includes a plurality of cutting teeth. The drum is mounted in a housing on the frame of the machine and adapted to be lowered into contact with the road surface and rotated about a horizontal axis so as to cut into the surface to a desired depth as the machine is advanced along the roadway. Generally, the milling machine also includes a conveyor system that is designed to carry the milled material that has been cut from the roadway by the rotating drum to a location in front of, to the rear of or beside the machine for deposit into a truck for removal from the milling site. One or more spray bars are typically mounted over the conveyors and inside the drum housing so that water may be sprayed to control the dust and heat that is generated in the milling process. In addition, a vacuum system may be provided to assist in removing dust generated in the milling process. Steerable track or wheel drive assemblies are provided to drive the machine and to steer it along a desired milling path. Power for driving the machine and for rotating the drum, either through a belt drive or a hydraulic system, is typically provided by a diesel engine.

Conventional milling machines include one or two front drive assemblies that are generally mounted inside the outer periphery of the machine housing. In addition, such machines usually include two rear drive assemblies, at least one of which extends laterally outside the machine housing to provide a wider footprint for increased stability. These drive assemblies are typically mounted so as to be adjustable in height with respect to the machine frame in order to move the frame carrying the milling drum upwardly and downwardly with respect to the surface on which the milling machine is placed for operation. However, because at least one of the conventional drive assemblies is located laterally outside the machine housing, it is difficult to make a flush cut along the edge of a roadway using such a machine.

It is known to equip a milling machine with an assembly for moving a rear drive assembly between two different positions, a first position which is laterally outside the periphery of the machine housing (and of the milling drum) and a second position which is laterally inside the periphery of the machine housing. Thus, U.S. Pat. No. 6,106,073 describes a milling machine having two rear support wheels, one of which is moveable from an exterior end position that projects beyond the periphery of the housing of the machine to an inside retracted position where the support wheel does not project outside the periphery of the housing. The support wheel moves between the outside and inside positions by a four-bar linkage arrangement that is actuated by a hydraulic cylinder so as to move in a horizontal plane. This machine also includes a separate locking bolt that may be manually placed through locking holes in the frame to retain the rear support wheel in either of the two end positions between which it may be moved.

The four-bar linkage arrangement of the '073 patent is complicated, and the manual locking mechanism is difficult for an operator to engage and disengage. Furthermore, moving a rear support wheel without raising it off the roadway surface requires considerable power, and it stresses the support wheel components.

U.S. Pat. No. 9,068,303 describes a road milling machine having a rear drive unit that is mounted at the lower end of a lifting column. A pivot arm is connected to the lifting column of the rear drive unit and to the machine frame. A steering assembly on the rear drive unit and a controller are provided to steer the rear drive unit while it remains in contact with the roadway and so that it may be operated to drive it between a first position which is laterally outside the machine housing (and of the milling drum) and a second position which is located within a recess of the machine housing. Steering of the rear drive unit while it is in contact with the ground at the first position or the second position in order to begin the process of moving the drive unit puts significant stresses on the steering assembly and the rear drive unit. Furthermore, because the rear drive unit cannot be moved to the second position with its long axis parallel to the side of the machine, the opening in the housing in the second position must be enlarged to permit steering and turning of the rear drive unit therein.

It would be desirable if a simple positioning assembly could be provided that would allow for positioning and locking the drive assembly in an outside position and an inside position without requiring manual manipulation of a locking pin by the operator. It would also be desirable if such a positioning assembly could be provided that would eliminate stress on the drive mechanism caused by maintaining contact with the roadway surface while moving the drive assembly between outside and inside positions. In addition, it would be desirable if the positioning assembly would allow for locking of the drive assembly at one or more intermediate positions between a first position outside the periphery of the housing and a second position inside the periphery of the housing, and for steering of the drive assembly in any position between and including the first position and the second position.

ADVANTAGES OF A PREFERRED EMBODIMENT OF THE INVENTION

Among the advantages of a preferred embodiment of the invention is that provides a positioning assembly for moving a drive assembly between a first position which is laterally outside the periphery of the machine housing (and of the milling drum) and a second position which is laterally within the periphery of the machine housing, and for locking the drive assembly in the first and second positions without requiring manual intervention by the operator. Another advantage of a preferred embodiment of the invention is that it allows for positioning the drive assembly in one or more intermediate positions between the first position and the second position, and for locking the assembly in any of the intermediate positions. Still another advantage of a preferred embodiment of the invention is that it provides for steering the drive assembly in the first position, the second position and any intermediate position between the first position and the second position. Additional objects and advantages of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended tennis (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest possible construction consistent with such definitions, as follows:

The tell "milling machine" refers to a machine having a milling or working drum that is adapted to be placed into contact with a roadway or road base surface for removing a portion of the surface. The term "milling machine" includes but is not limited to machines that are sometimes referred to as road stabilizers and roadway reclaiming machines.

The term is "above", "upper" and similar terms, when used with respect to a milling machine or a component of a milling machine, refer to a relative location or direction away from the surface on which the machine is placed for operation.

The terms "below", "lower" and similar terms, when used with respect to a milling machine or a component of a milling machine, refer to a relative location or direction towards the surface on which the machine is placed for operation.

The term "milling direction" refers to the primary direction of travel of a milling machine as it operates in milling a roadway or road bed.

The terms "front", "forward" and similar terms, when used with respect to a milling machine or a component of a milling machine, refer to a relative location or direction towards the leading end of the milling machine as it travels in the milling direction.

The term "rear" and similar terms, when used with respect to a milling machine or a component of a milling machine, refer to a relative location or direction towards the trailing end of the milling machine as it travels in the milling direction.

The term "left", as used herein to indicate a side of a milling machine or in reference to a component on one side of a milling machine, refers to a position or orientation towards the left, from the perspective of the operator who is driving the machine in the milling direction.

The term "right", as used herein to indicate a side of a milling machine or in reference to a component on one side of a milling machine, refers to a position or orientation towards the right, from the perspective of the operator who is driving the machine in the milling direction.

The term "generally vertical" and similar terms, when used with respect to a milling machine or a component of a milling machine, refer to a direction or orientation that is generally perpendicular to the roadway or other surface on which the milling machine is placed for operation.

The terms "actuator" and "linear actuator" refer to an electric, pneumatic hydraulic, electro-hydraulic or mechanical device that generates force which is directed in a straight line. One common example of a linear actuator is a double-acting hydraulic or pneumatic actuator which includes a cylinder, a piston within the cylinder, and a rod attached to the piston. By increasing the pressure within the cylinder on one side of the piston (over that on the opposite side of the piston), the rod will extend from the cylinder or retract into the cylinder. The term "actuator" includes but is not limited to a device having two rod ends with a piston mounted therebetween, which device is adapted to selectively generate a force in a first direction or in a second direction that is disposed 180° away from the first direction.

SUMMARY OF THE INVENTION

The invention comprises a milling machine for milling a surface of a roadway or road bed. The milling machine includes a frame, a housing, a milling drum mounted on the frame within the housing and a drive assembly. A positioning assembly is provided for moving the drive assembly between a first position which is laterally outside the periphery of the machine housing and a second position which is laterally inside the periphery of the machine housing, and for locking the drive assembly in at least the first and second positions without requiring the operator to manually manipulate a locking pin.

The preferred drive assembly of the milling machine comprises a drive mechanism and an inner tube that is attached to the drive mechanism. The preferred positioning assembly includes a frame portion, a pivot assembly and a positioning actuator. The frame portion is attached to the frame of the milling machine and includes a first frame locking component that is associated with the first position for the drive assembly, a second frame locking component that is associated with the second position for the drive assembly, and a generally vertical pivot pin. The pivot assembly is pivotally mounted on the pivot pin of the frame portion and is adapted to move upwardly and downwardly on the pivot pin. This pivot assembly further comprises an outer tube that is adapted to receive the inner tube of the drive assembly and to be in sliding engagement therewith, and an elevating actuator that is adapted to move the drive mechanism, between a contact position on the surface on which the machine is placed for operation and a non-contact position that is off the surface on which the machine is placed for operation, by moving the inner tube of the drive assembly with respect to the outer tube. The pivot assembly also includes a pivot component having a pivot locking component that is adapted to cooperate with the first frame locking component of the frame portion and alternatively with the second frame locking component of the frame portion, and a locking actuator that is adapted to move the pivot assembly generally vertically on the pivot pin of the frame portion between a locking elevation and an unlocking elevation. The preferred positioning assembly also includes a positioning actuator that is adapted to pivot the pivot assembly on the pivot pin with respect to the frame portion between a first pivot position in which the first frame locking component of the frame portion is aligned with the pivot locking component and a second pivot position in which the second frame locking component is aligned with the pivot locking component. This positioning assembly is configured and arranged so that the drive assembly is in the first position when the first frame locking component is aligned with the pivot locking component, and the drive assembly is in the second position when the second frame locking component is aligned with the pivot locking component. Actuation of the locking actuator to move the pivot assembly from the unlocking elevation to the locking elevation when the first frame locking component is aligned with the pivot locking component will lock the pivot assembly to the frame portion with the drive assembly in the first position. Similarly, actuation of the locking actuator to move the pivot assembly from the locking elevation to the unlocking elevation when the first frame locking component is aligned with the pivot locking component will unlock the pivot assembly from the frame portion with the drive assembly in the first position. Actuation of the locking actuator to move the pivot assembly from the unlocking elevation to the locking elevation when the second frame locking component is aligned with the pivot locking component will lock the pivot assembly to the frame portion with the drive assembly in the second position, and actuation of the locking actuator to move the pivot assembly from the locking elevation to the unlocking elevation when the second frame locking component is aligned with the pivot locking component will unlock the pivot assembly from the frame portion with the drive assembly in the second position.

In a particularly preferred embodiment of the invention, the frame portion of the positioning assembly comprises a C-shaped frame portion having an upper frame plate and a lower frame plate, and the pivot pin is mounted between the upper frame plate and the lower frame plate. In this embodiment, the first frame locking component of the frame portion comprises a first positioning boss that is located on the underside of the upper frame plate, and the second frame locking component of the frame portion comprises a second positioning boss that is located on the underside of the upper frame plate. In this embodiment of the invention, the pivot assembly comprises an upper pivot plate and a lower pivot plate, and the outer tube of the pivot assembly is mounted between the lower pivot plate and the upper pivot plate. Furthermore, the pivot locking component of the pivot assembly comprises a recess in the upper pivot plate that is adapted to receive the first positioning boss, and alternatively, the second positioning boss. The positioning actuator is adapted to pivot the pivot assembly on the pivot pin with respect to the frame portion between a first pivot position in which the first positioning boss is aligned with the recess in the upper pivot plate and a second pivot position in which the second positioning boss is aligned with the recess in the upper pivot plate. The positioning assembly is configured and arranged so that the drive assembly is in the first position when the first positioning boss is aligned with the recess in the upper pivot plate, and the drive assembly is in the second position when the second positioning boss is aligned with the recess in the upper pivot plate. Actuation of the locking actuator to move the pivot assembly from the unlocking elevation to the locking elevation when the first positioning boss is aligned with the recess in the upper pivot plate will cause the first positioning boss to be received in the recess in the upper pivot plate and lock the pivot assembly to the frame portion with the drive assembly in the first position, and actuation of the locking actuator to move the pivot assembly from the locking elevation to the unlocking elevation when the first positioning boss is aligned with and received in the recess in the upper pivot plate will disengage the first positioning boss from the recess and unlock the pivot assembly from the frame portion with the drive assembly in the first position. Furthermore, actuation of the locking actuator to move the pivot assembly from the unlocking elevation to the locking elevation when the second positioning boss is aligned with the recess in the upper pivot plate will cause the second positioning boss to be received in the recess in the upper pivot plate and lock the pivot assembly to the frame portion with the drive assembly in the second position, and actuation of the locking actuator to move the pivot assembly from the locking elevation to the unlocking elevation when the second positioning boss is aligned with and received in the recess in the upper pivot plate will disengage the second positioning boss from the recess and unlock the pivot assembly from the frame portion with the drive assembly in the second position.

In order to facilitate an understanding of the invention, the preferred embodiment of the invention is illustrated in the drawings, and a detailed description thereof follows. It is not intended, however, that the invention be limited to the particular embodiment described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
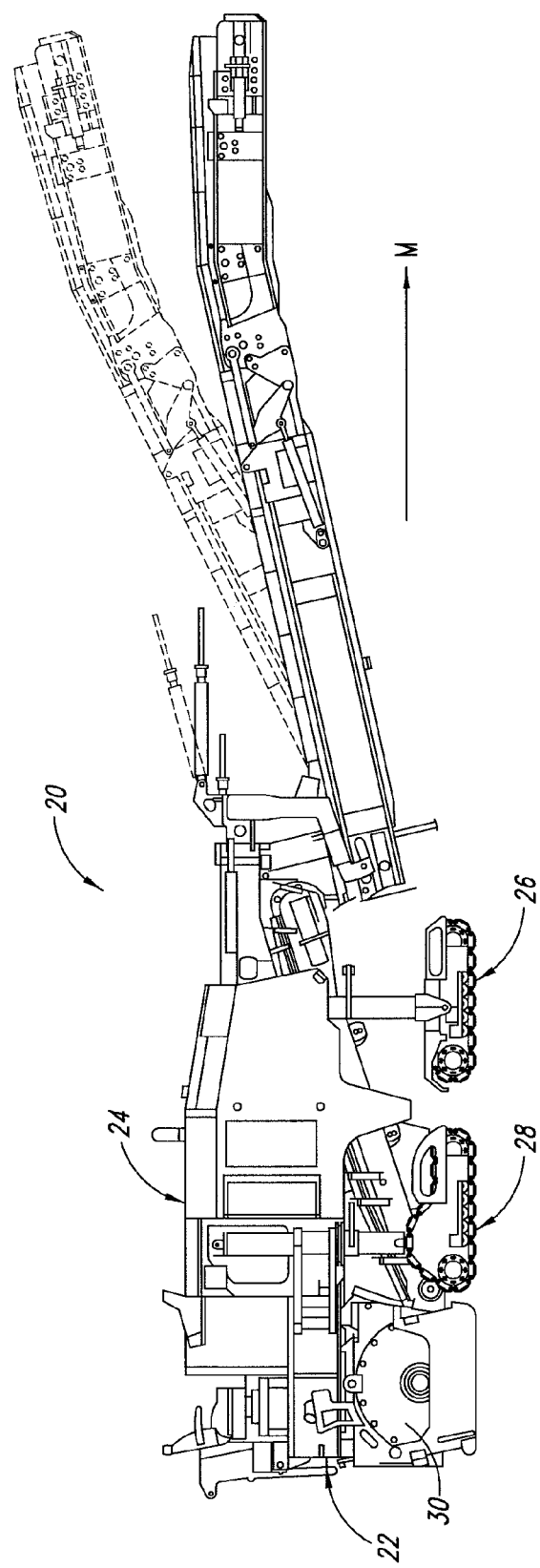
FIG. 1 is a side view of a milling machine to which a preferred embodiment of the invention may be applied, showing a right rear drive assembly in a position that is inside the periphery of the machine housing.

FIG. 1 illustrates milling machine 20 to which a preferred embodiment of the invention may be applied. Milling machine 20 comprises a mobile vehicle having a frame 22 on which is mounted machine housing 24. Milling machine 20 also includes a plurality of ground-engaging drive assemblies, including right front drive assembly 26, right rear drive assembly 28, a left front drive assembly (not shown, but substantially similar to right front track assembly 26) and a left rear drive assembly (also not shown). As is conventional, linear actuators (not shown in FIG. 1) within the tubular columns supporting the drive assemblies are adapted to raise and lower the frame of the milling machine with respect to the surface being milled. The drive assemblies of machine 20 are driven by a machine drive system including conventional hydraulic motors (not shown) and an engine (also not shown) to advance the machine across the surface of a roadway, road bed, parking lot or other surface to be milled in the working direction (or milling direction) indicated by arrow M. Milling machine 20 also includes a milling assembly comprising a generally cylindrical milling drum 30 having a plurality of cutting teeth. The milling drum is mounted for rotation on the frame and is adapted for cutting a width of material from the surface in the path of the machine. The invention may also be employed in connection with a wheel-driven machine (not shown) such as is known to those having ordinary skill in the art to which the invention relates. One or more of the drive assemblies of the illustrated machine, including right rear drive assembly 28, is steerable to provide precise directional control.

Figure 2:
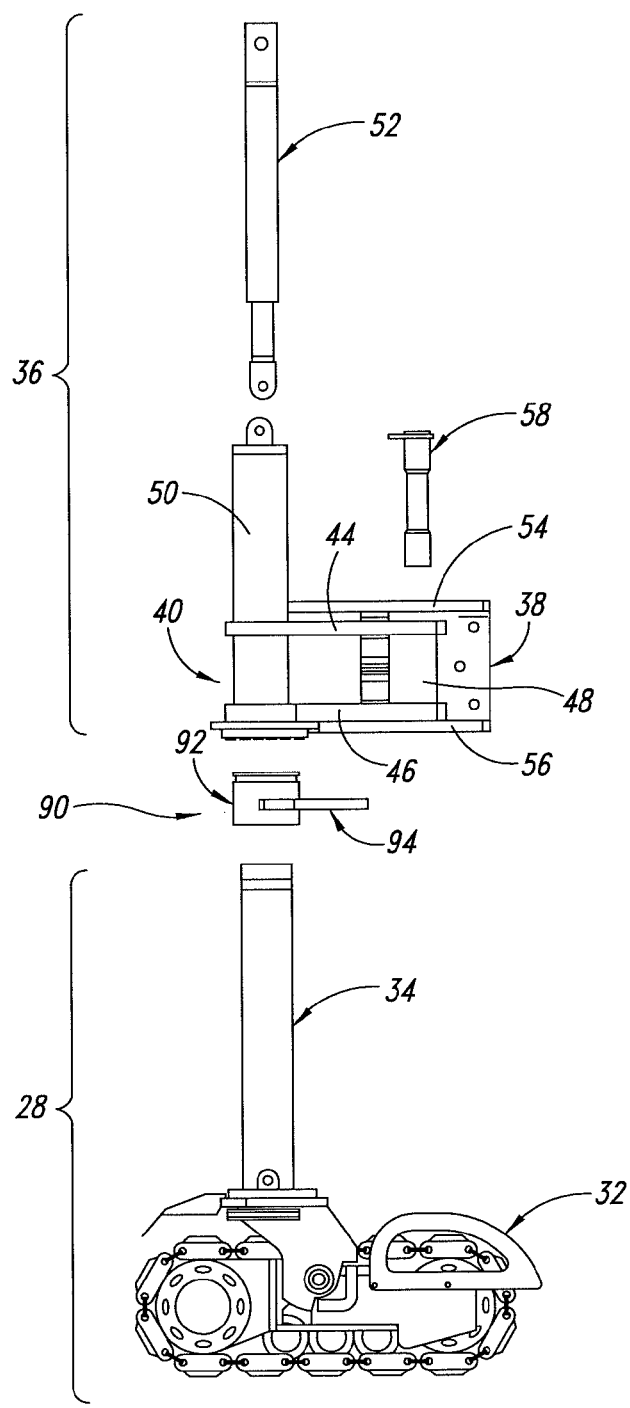
FIG. 2 is an exploded side view of the drive positioning assembly for a rear drive assembly such as is illustrated in FIG. 1.
Figure 3:
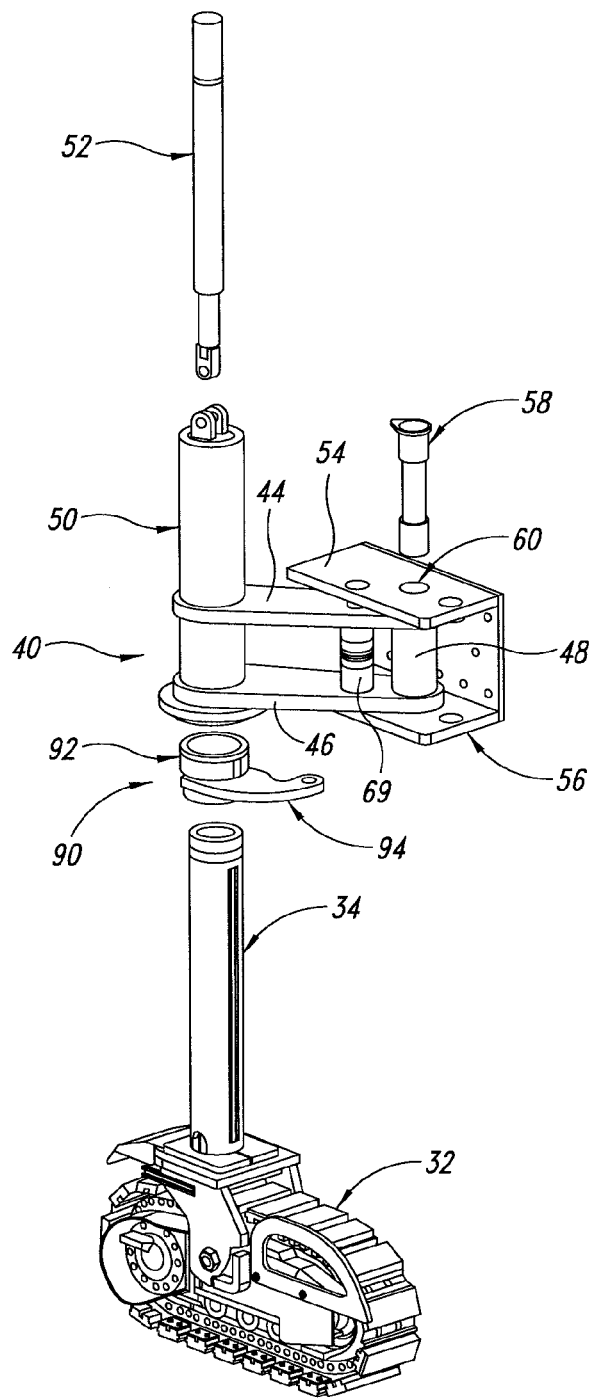
FIG. 3 is an exploded perspective view of the drive positioning assembly and rear drive assembly shown in FIG. 2.
Figure 11:
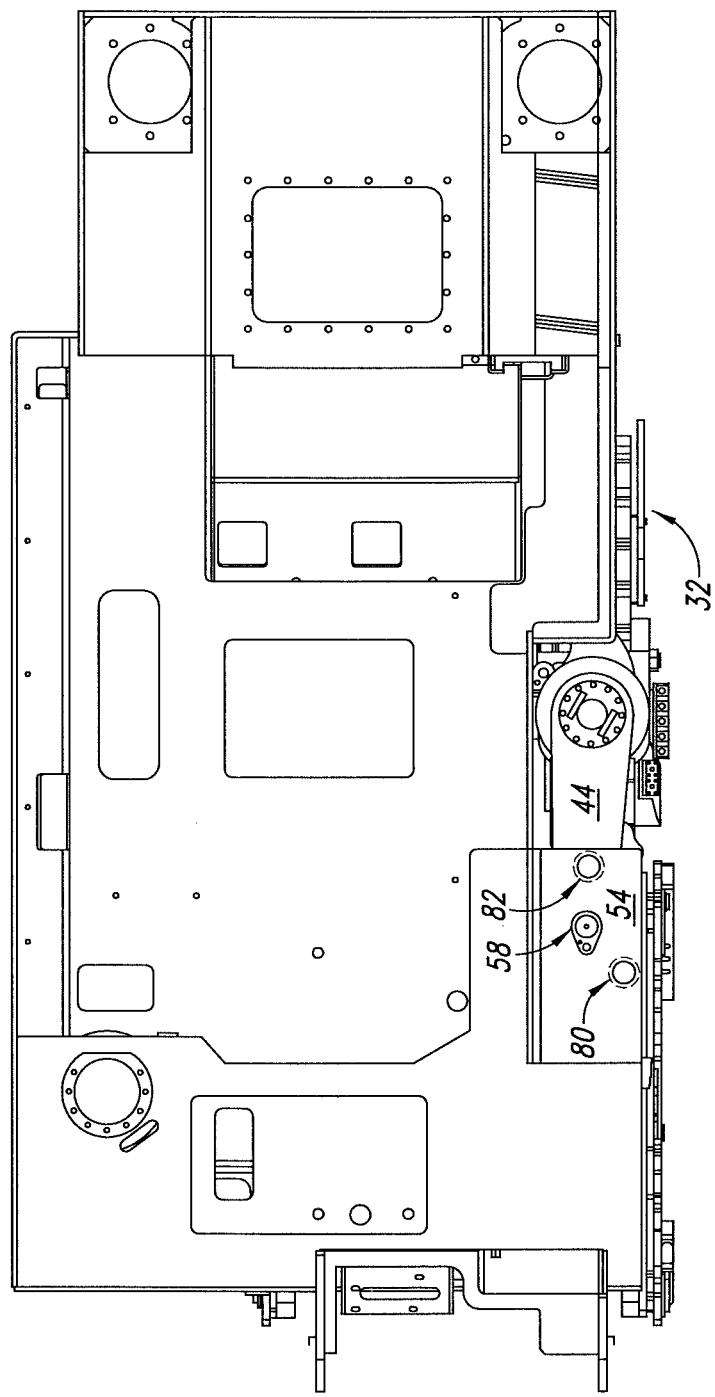
FIG. 11 is a top view of a portion of a milling machine housing and rear drive assembly comprising the invention, showing the right rear drive assembly in the second position which is laterally inside the periphery of the machine housing.

Although the invention may be employed in connection with a front and/or a rear drive assembly, in the embodiment of the invention illustrated in the drawings, the invention is adapted to move right rear drive assembly 28 between a first position which is outside the housing of the milling machine (shown in FIGS. 4 and 5) and a second position which is inside the machine housing (shown in FIG. 11). Right rear drive assembly 28 includes conventional drive mechanism 32 that is attached to inner tube 34 (shown in FIGS. 2 and 3).

Figure 4:
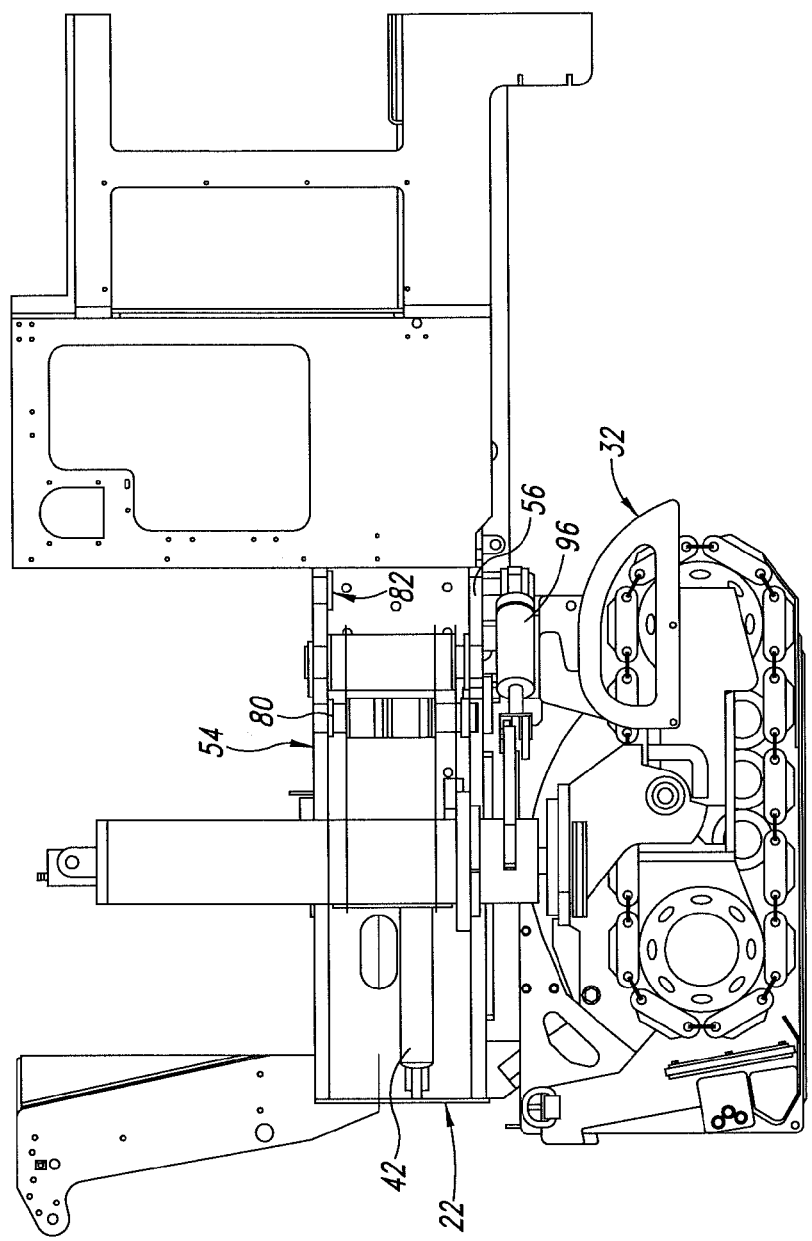
FIG. 4 is a side view of a portion of a milling machine housing and a rear drive assembly equipped with the invention, illustrating the positioning of the rear drive assembly in a first position which is laterally outside the periphery of the machine housing.
Figure 5:
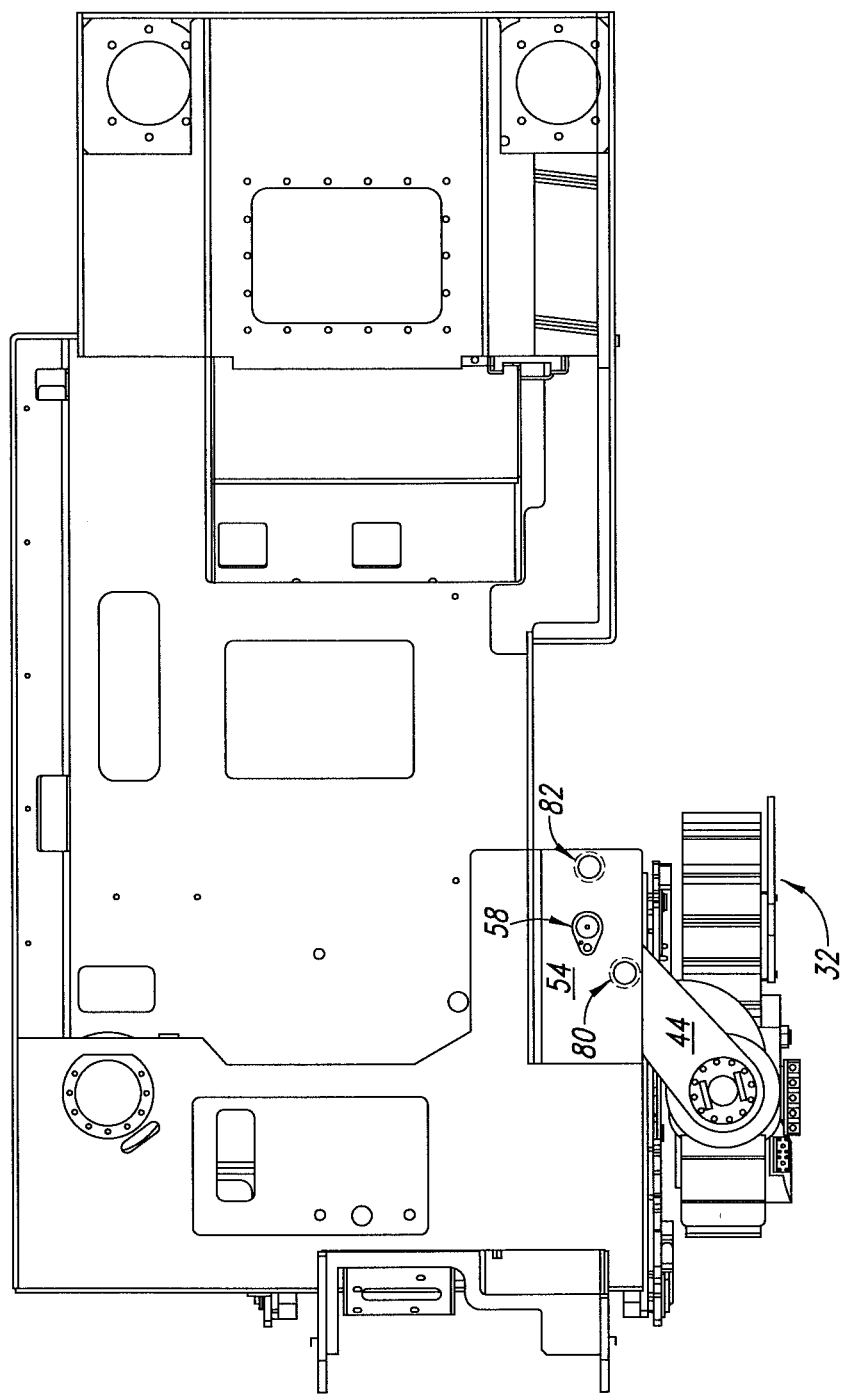
FIG. 5 is a top view of a portion of the milling machine housing and rear drive assembly shown in FIG. 4, showing the right rear drive assembly in the first position.
Figure 6:
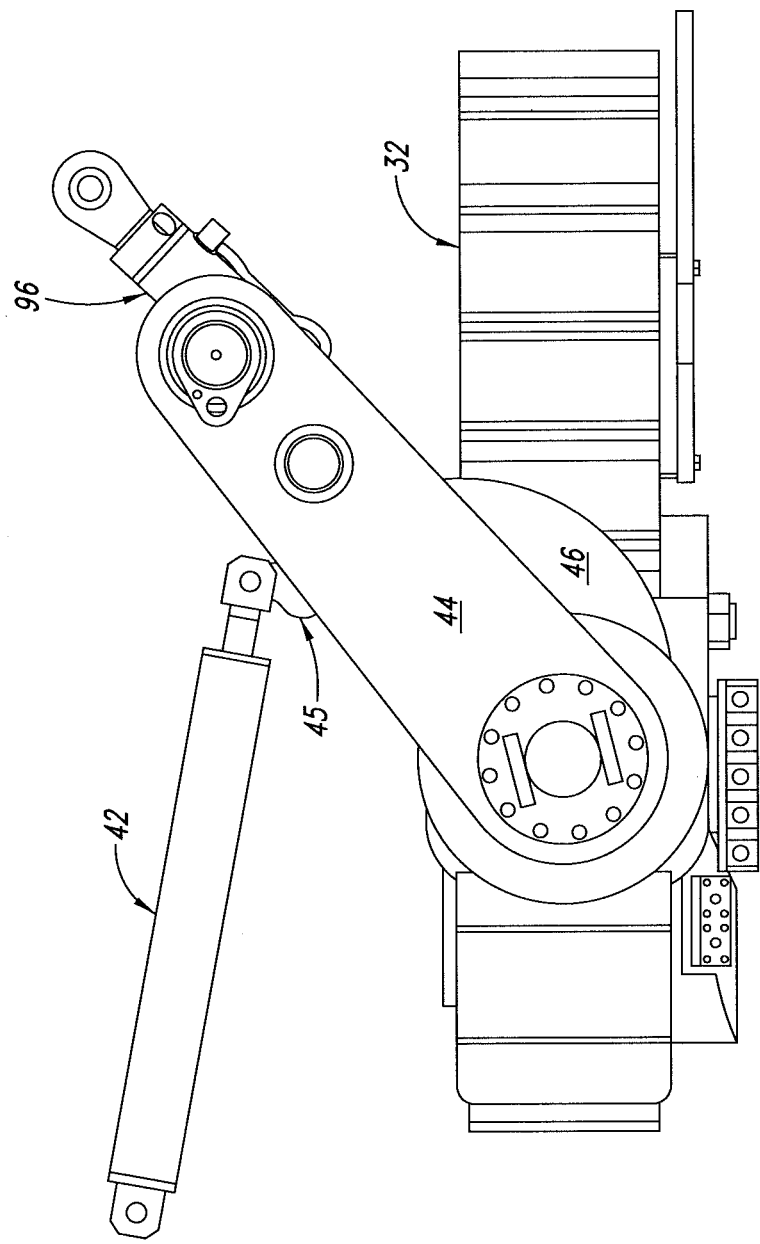
FIG. 6 is a top view of a portion of the rear drive assembly and positioning assembly shown in FIGS. 4 and 5, showing the right rear drive assembly in the first position.

Preferred positioning assembly 36 includes C-shaped frame portion 38, pivot assembly 40 and positioning actuator 42 (shown in FIGS. 4 and 6). Positioning actuator 42 is attached between frame 22 of the milling machine and pivot arm 45 of lower pivot plate 46 of pivot assembly 40. Pivot assembly 40 comprises upper pivot plate 44 and lower pivot plate 46. Pivot assembly 40 also includes pivot tube 48 that is attached between upper pivot plate 44 and lower pivot plate 46. In addition, outer tube 50 is mounted between upper pivot plate 44 and lower pivot plate 46 and preferably extends through the upper pivot plate. Inner tube 34 of right rear drive assembly 28 is adapted to move vertically with respect to outer tube 50 of pivot assembly 40, as controlled by elevating actuator 52. This allows right rear drive mechanism 32 to be raised with respect to C-shaped frame portion 38 and thereby lifted off the surface on which the milling machine is placed in order to move the drive assembly between the first position which is laterally outside the periphery of the machine housing (shown in FIGS. 4 and 5) and the second position which is laterally within the periphery of the machine housing (shown in FIG. 11).

C-shaped frame portion 38 is attached to frame 22 of machine 20, as best shown in FIG. 4, and includes upper frame plate 54 and lower frame plate 56. Also attached to C-shaped frame portion 38 is generally vertical pivot pin 58, which is inserted through hole 60 in upper frame plate 54, through pivot tube 48 of pivot assembly 40, and into a hole (not shown, but substantially similar to hole 60) in lower frame plate 56. As best shown in FIGS. 7-10, the distance "$D_C$" between lower surface 62 of upper frame plate 54 of C-shaped frame portion 38 and upper surface 64 of lower frame plate 56 of the C-shaped frame portion is greater than the distance "$D_P$" between upper surface 66 of upper pivot plate 44 of pivot assembly 40 and lower surface 68 of lower pivot plate 46 of the pivot assembly by an amount $D=D_C-D_P$. The pivot pin and the relative dimensions of the pivot assembly and C-shaped frame portion permit pivot assembly 40 to pivot with respect to C-shaped frame portion 38, as controlled by positioning actuator 42 (shown in FIGS. 4 and 6) that is attached between pivot arm 45 of pivot assembly 40 and frame 22 of machine 20.

Certain of the components of pivot assembly 40 are shown in some detail in each of FIGS. 7-10. As shown therein, locking actuator 69 is adapted to move pivot assembly 40 generally vertically on pivot pin 58 of C-shaped frame portion 38 between an unlocking elevation (illustrated in FIGS. 7 and 8) and a locking elevation (illustrated in FIGS. 9 and 10). Locking actuator 69 comprises cylinder 70 that is mounted in pivot assembly 40. Locking actuator 69 includes piston 72 to which is attached upper rod 74 and lower rod 76. Because of the configuration of locking actuator 69, piston 72 can move between the upper position shown in FIG. 8 and the lower position shown in FIG. 10.

In the embodiment of the invention shown in the drawings, pivot assembly 40 includes a pivot locking component comprising recess 78 in upper pivot plate 44 that extends from upper surface 66. C-shaped frame portion 38 includes a first frame locking component comprising first positioning boss 80 (see FIGS. 4 and 5) that is associated with the first position for the drive assembly, i.e., outside the housing of the milling machine. Similarly, C-shaped frame portion 38 includes a second frame locking component comprising second positioning boss 82 (see FIGS. 7, 9 and 11) that is associated with the second position for the drive assembly, i.e., laterally within the periphery of housing 24 of the milling machine. Other frame locking components (not shown) comprising one or more intermediate positioning bosses may be provided which are associated with intermediate positions for the drive assembly, i.e., between the first position shown in FIG. 5 and the second position shown in FIG. 11.

Figure 7:
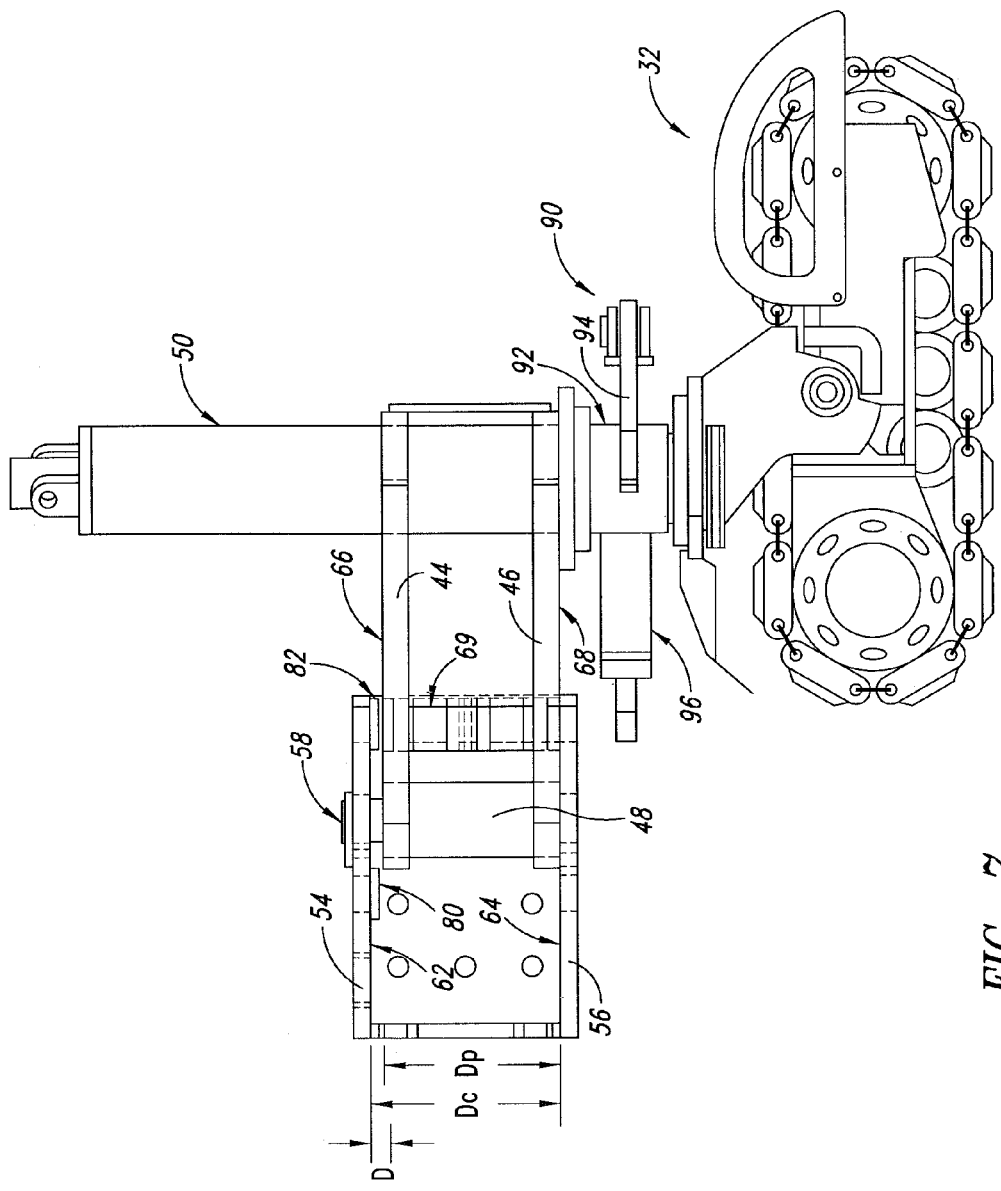
FIG. 7 is a side view of the portion of the rear drive assembly and associated positioning assembly shown in FIG. 6, illustrating the location of the drive assembly in a second position which is laterally inside the periphery of the housing of the machine, with the positioning assembly in an unlocked orientation that permits movement of the drive assembly between the first and second positions.
Figure 8:
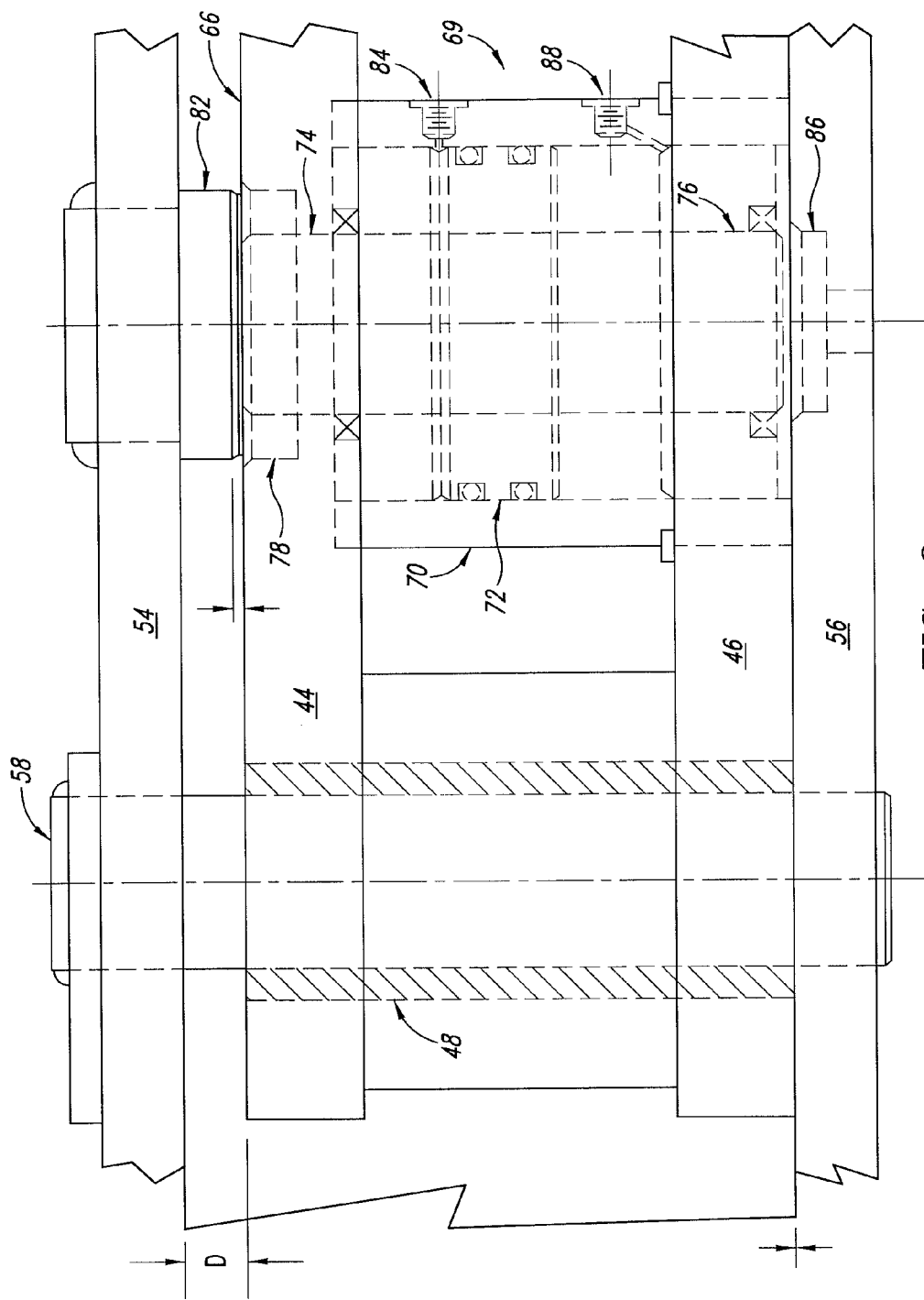
FIG. 8 is a detailed view of a portion of the positioning assembly illustrated in FIG. 7.
Figure 9:
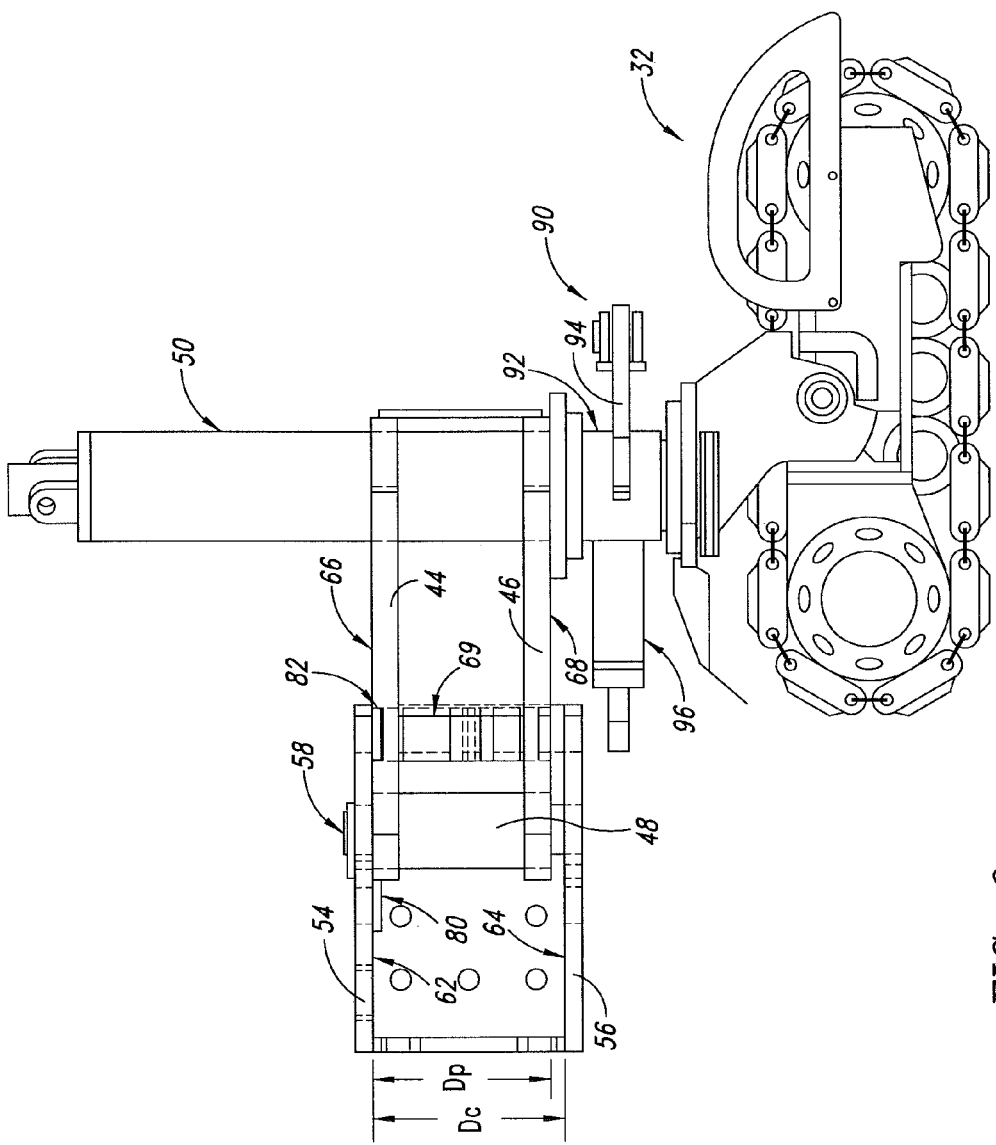
FIG. 9 is a side view of the portion of the rear drive assembly and associated positioning assembly shown in FIGS. 6 and 7, illustrating the location of the drive assembly in the second position, with the positioning assembly in an orientation that is locked.
Figure 10:
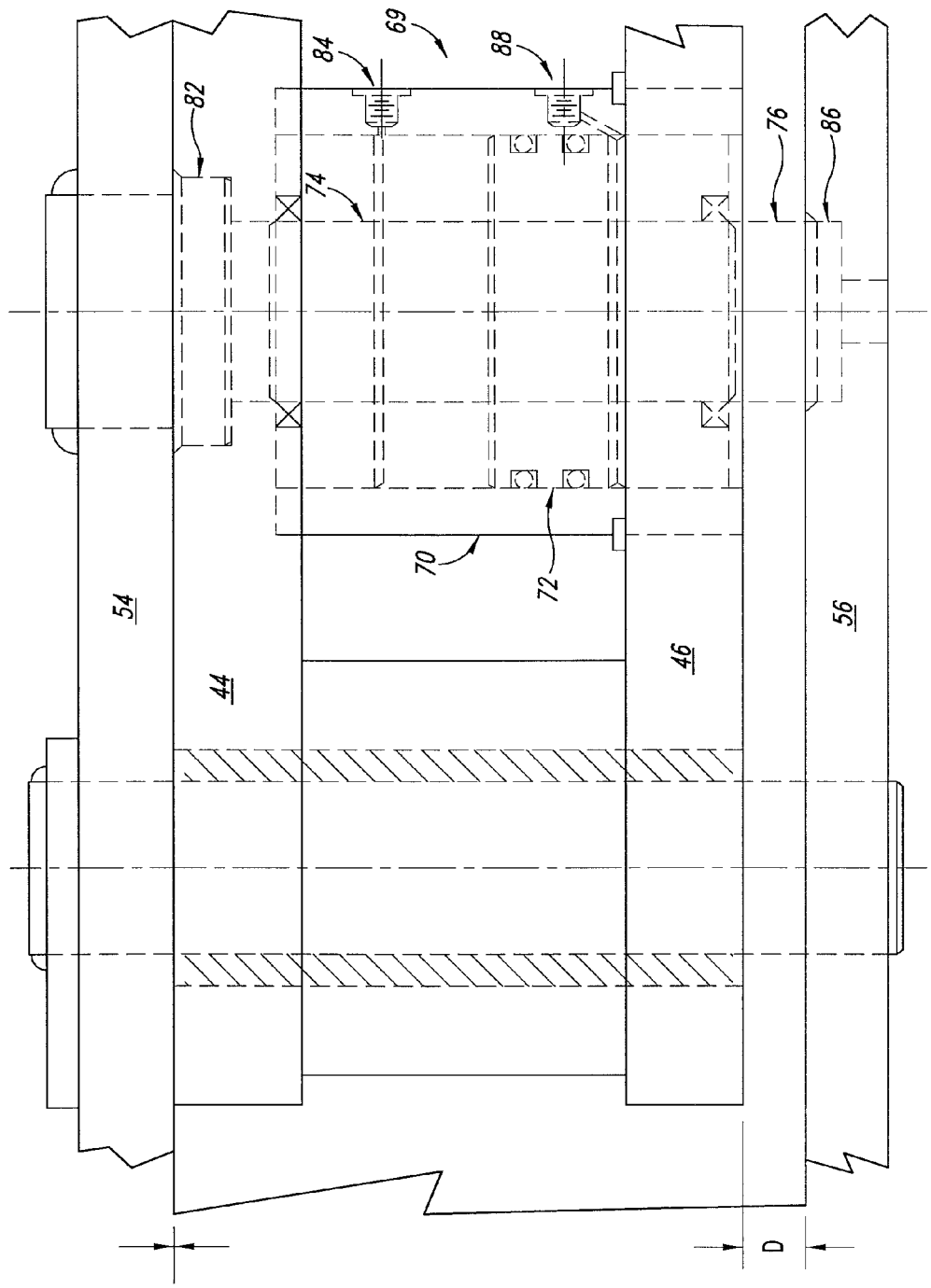
FIG. 10 is a detailed view of a portion of the positioning assembly illustrated in FIG. 9.

As described above, positioning actuator 42 (shown in FIGS. 4 and 6) is attached between pivot assembly 40 and frame 22 of machine 20. Positioning actuator 42 is adapted to pivot or move pivot assembly 40 on pivot pin 58 with respect to C-shaped frame portion 38 between a first pivot position in which the first frame locking component of the frame portion is aligned with the pivot locking component and a second pivot position in which the second frame locking component is aligned with the pivot locking component. FIGS. 7-10 illustrate the orientation of pivot assembly 40 with respect to C-shaped frame portion 38 in the second pivot position, in which the second frame locking component comprising second positioning boss 82 is aligned with the pivot locking component comprising recess 78 in upper pivot plate 44. FIGS. 7 and 8 illustrate pivot assembly 40 in the unlocked elevation in the second pivot position, and FIGS. 9 and 10 illustrate pivot assembly 40 in the locked elevation. In this embodiment of the invention, lower pivot plate 46 of pivot assembly 40 is adjacent to lower frame plate 56 of C-shaped frame portion when the pivot assembly is in the unlocked elevation (shown in FIGS. 7 and 8), and upper pivot plate 44 of pivot assembly 40 is adjacent to upper frame plate 54 of C-shaped frame portion 38 when the pivot assembly is in the locked elevation (shown in FIGS. 9 and 10). However, these positions could easily be reversed by locating a recess similar to recess 78 in lower pivot plate 46 and positioning bosses similar to bosses 80 and 82 on upper surface 64 of lower frame plate 56, and such a configuration is contemplated within the scope of the claims herein.

When pivot assembly 40 is in the first pivot position or the second pivot position and in the unlocked elevation shown in FIGS. 7 and 8, fluid may be introduced through port 84 to drive piston 72 downwardly from the position shown in FIG. 8 to the position shown in FIG. 10. When this happens, the bottom end of lower rod 76 will be received in recess 86 in lower frame plate 56, and the reaction force generated by the movement of piston 72 will cause pivot assembly 40 to move upwardly from the unlocked elevation shown in FIGS. 7 and 8 to the locked elevation shown in FIGS. 9 and 10 in which positioning boss 82 is received in recess 78. Similarly, when pivot assembly 40 is in the locked elevation shown in FIGS. 9 and 10, fluid may be introduced through port 88 to drive piston 72 upwardly from the position shown in FIG. 10 to the position shown in FIG. 8. This will disengage the bottom end of lower rod 76 from recess 86 in lower frame plate 56 and will disengage positioning boss 82 from recess 78, and the reaction force generated by the movement of piston 72 will cause pivot assembly 40 to move downwardly from the locked elevation shown in FIGS. 9 and 10 to the unlocked elevation shown in FIGS. 7 and 8.

Steering knuckle 90 includes steering tube 92 and steering arm 94. Steering tube 92 is disposed over and attached to inner tube 34 below first outer tube 50, so that steering knuckle 90 may rotate about the axis of steering tube 92 (and that of the inner tube) with respect to outer tube 50, as controlled by steering actuator 96 that is attached between the steering arm and the frame of the milling machine, in order to steer or change the orientation of drive mechanism 32.

Preferably, the positioning assembly is configured so that when pivot assembly 40 is locked to C-shaped frame portion 38 in the first position (shown in FIG. 5), steering actuator 96 cannot be operated to steer drive mechanism 32; however, when pivot assembly 40 is unlocked and the drive assembly moved towards the second position, steering actuator 96 can be used to change the orientation of the drive mechanism 32 as the drive assembly is moved between the first and second positions so that the tracks (or wheels) of the drive mechanism can be oriented to roll in a forward direction at both the first and second positions without the necessity for pivoting the drive assembly through an angle of 180°, as is required by some prior art systems. When pivot assembly 40 is locked to C-shaped frame portion 38 in the second position, drive mechanism 32 is free to rotate for steering purposes by operation of steering actuator 96 that is connected between the frame and steering knuckle 90. Outer tube 50 is free to move vertically with respect to inner tube 34 at all positions of the drive mechanism by operation of elevating actuator 52 to adjust the cut depth of the milling drum on the right side of the machine.

Figure 13:
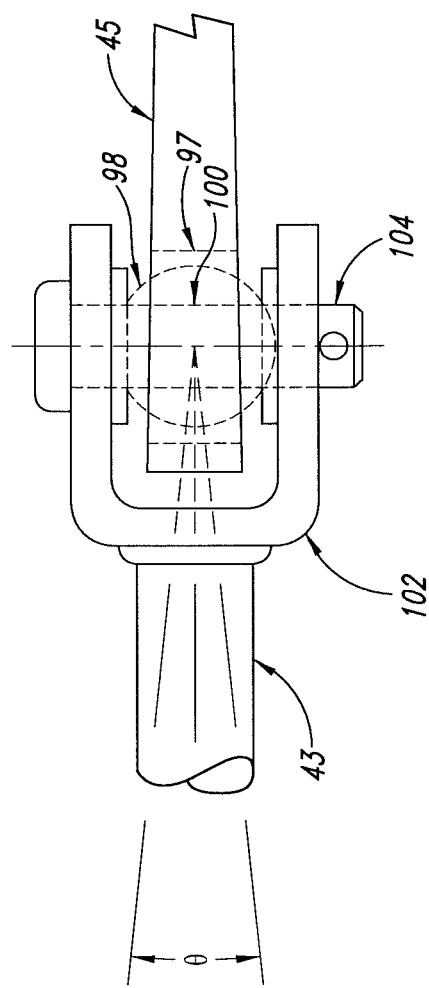
FIG. 13 is a detailed view of the connection of the positioning actuator to the pivot assembly of the positioning assembly in such a manner as to accommodate a certain amount of vertical movement.

Since pivot assembly 40 is adapted to move vertically through a distance "D" with respect to C-shaped frame portion 38, it is preferred that positioning actuator 42 be mounted between the positioning assembly and the frame of machine 20 in such a way as to accommodate this vertical movement. Thus, as shown in FIGS. 6 and 13, rod 43 of positioning actuator 42 is pivotally attached to pivot arm 45 of lower pivot plate 46. This attachment is accomplished by providing ball socket insert 97 in a cavity in the end of pivot arm 45, and a mating ball 98 in the ball socket insert. Ball 98 includes a central bore 100 which is aligned with corresponding holes in clevis 102 on the end of rod 43 of positioning actuator 42. Pin 104 is placed through the holes in clevis 102 and ball 98 to secure rod 43 of positioning actuator 42 to pivot arm 45 of lower pivot plate 46 in such a manner as to permit the long axis of rod 43 to move within an angle θ to accommodate vertical movement of pivot assembly 40 with respect to C-shaped frame portion 38. A similar ball and socket assembly is also employed at the end of positioning actuator 42 where it attaches to frame 22, although this assembly is not shown in the drawings.

Figure 12:
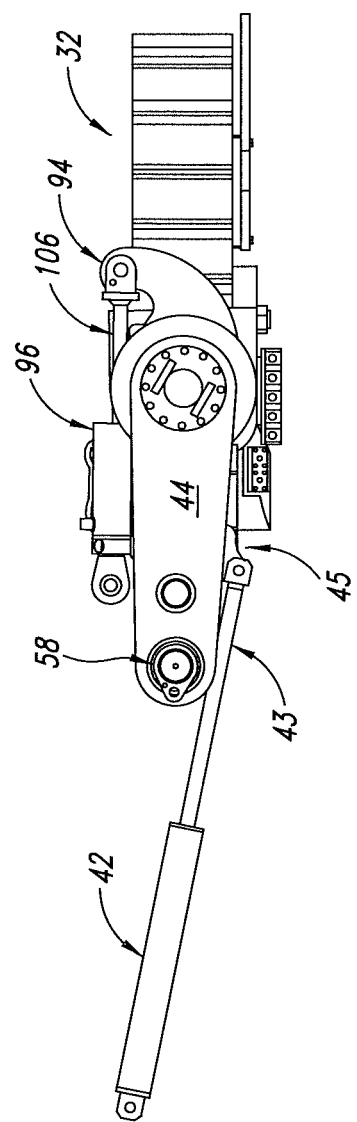
FIG. 12 is a top view of a portion of the rear drive assembly and positioning assembly illustrated in FIG. 11, showing the right rear drive assembly in the second position.
Figure 14:
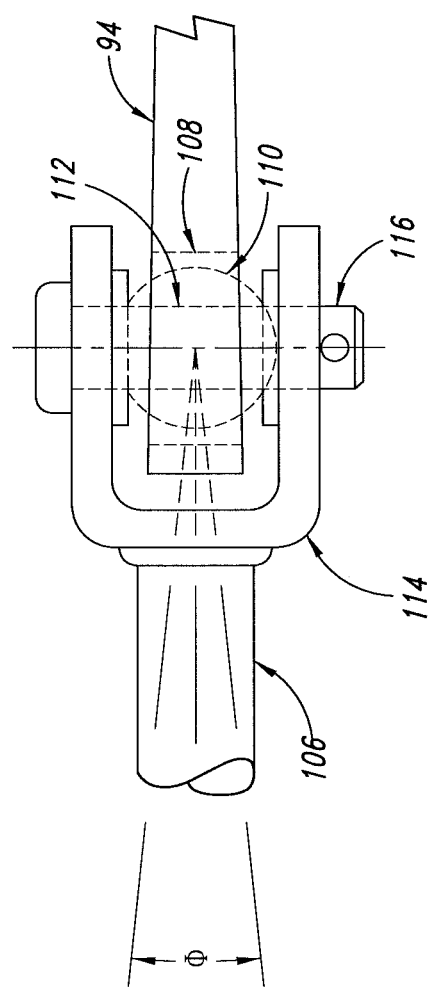
FIG. 14 is a detailed view of the connection of the steering actuator to the steering arm of the positioning assembly in such a manner as to accommodate a certain amount of vertical movement.

It may also be desirable to attach steering knuckle 90 for vertical movement with pivot assembly 40 while still allowing it to pivot with respect thereto. In such circumstance, it will also be desirable to accommodate the vertical movement of pivot assembly (and steering knuckle 90) with respect to the frame of machine 20. Thus, as shown in FIGS. 12 and 14, rod 106 of steering actuator 96 is pivotally attached to steering arm 94 of steering knuckle 90. This attachment is accomplished by providing ball socket insert 108 in a cavity in the end of steering arm 94, and a mating ball 110 in the ball socket insert. Ball 110 includes a central bore 112 which is aligned with corresponding holes in clevis 114 on the end of rod 106 of steering actuator 96. Pin 116 is placed through the holes in clevis 114 and ball 110 to secure rod 106 of steering actuator 96 to steering arm 94 of steering knuckle 90 in such a manner as to permit the long axis of rod 106 to move within an angle Φ to accommodate vertical movement of pivot assembly 40 with respect to C-shaped frame portion 38. A similar ball and socket assembly is also employed at the end of steering actuator 96 where it attaches to frame 22, although this assembly is not shown in the drawings.

As shown in the drawings, positioning assembly 36 is adapted to move right rear track drive assembly 28 between a first position which is laterally outside the periphery of the machine housing, through a number of intermediate positions and a second position which is laterally inside the periphery of the machine housing. This movement is accomplished by actuating elevating actuator 52 to move drive mechanism 32 from a contact position on the surface on which the milling machine is placed for operation to a raised non-contact position. Then, locking actuator 69 is actuated to move pivot assembly 40 to unlock the pivot assembly from C-shaped frame portion 38, and positioning actuator 42 is actuated to pivot the pivot assembly on the pivot pin with respect to the C-shaped frame portion between the first pivot position and the second pivot position. Positioning actuator 42 may locate the pivot assembly at the first position, the second position, or at any intermediate position between the first position and the second position. Locking actuator 69 may then be actuated to move the pivot assembly with respect to the C-shaped frame portion to lock the pivot assembly to the frame portion. Finally, elevating actuator 52 is actuated once again to move the drive mechanism from the non-contact position to the contact position. Steering actuator 96 may be employed to steer the drive mechanism 32 at the first position, the second position, or at any intermediate position between the first position and the second position.

Although this description contains many specifics, these should not be construed as limiting the scope of the invention but as merely providing illustrations of some of the presently preferred embodiments thereof, as well as the best mode contemplated by the inventors of carrying out the invention. The invention, as described and claimed herein, is susceptible to various modifications and adaptations as would be appreciated by those having ordinary skill in the art to which the invention relates.

What is claimed is:

1. A milling machine for milling a surface of a roadway, said milling machine comprising:
   (A) a frame;
   (B) a housing;
   (C) a milling drum mounted on the frame within the housing;
   (D) a drive assembly comprising a drive mechanism;
   (E) a positioning assembly for moving the drive assembly between a first drive assembly position which is laterally outside the housing and a second drive assembly position which is laterally inside the housing, said positioning assembly comprising:
      (1) a frame portion that is attached to the frame, said frame portion comprising:
         (a) a first frame locking component that is associated with the first drive assembly position for the drive assembly;
         (b) a second frame locking component that is associated with the second drive assembly position for the drive assembly;
         (c) a vertical pivot pin;
      (2) a pivot assembly that is pivotally mounted on the pivot pin of the frame portion and is adapted to move vertically on the pivot pin, said pivot assembly further comprising:
         (a) an elevating actuator that is adapted to move the drive mechanism, between a contact position on the surface on which the machine is placed for operation and a non-contact position that is off the surface on which the machine is placed for operation;
         (b) a pivot locking component that is adapted to cooperate with the first frame locking component of the frame portion and alternatively with the second frame locking component of the frame portion;
         (c) a locking actuator that is adapted to move the pivot assembly vertically on the pivot pin of the frame portion between a locking elevation and an unlocking elevation;
      (3) a positioning actuator that is adapted to pivot the pivot assembly on the pivot pin with respect to the frame portion between a first pivot position in which the first frame locking component of the frame portion is aligned with the pivot locking component and a second pivot position in which the second frame locking component is aligned with the pivot locking component;
   wherein the positioning assembly is configured and arranged so that:
   (F) the drive assembly is in the first drive assembly position when the first frame locking component is aligned with the pivot locking component; and
   (G) actuation of the locking actuator to move the pivot assembly from the unlocking elevation to the locking elevation when the first frame locking component is aligned with the pivot locking component will lock the pivot assembly to the frame portion with the drive assembly in the first drive assembly position; and
   (H) actuation of the locking actuator to move the pivot assembly from the locking elevation to the unlocking elevation when the first frame locking component is aligned with the pivot locking component will unlock the pivot assembly from the frame portion with the drive assembly in the first drive assembly position; and (I) the drive assembly is in the second drive assembly position when the second frame locking component is aligned with the pivot locking component; and (J) actuation of the locking actuator to move the pivot assembly from the unlocking elevation to the locking elevation when the second frame locking component is aligned with the pivot locking component will lock the pivot assembly to the frame portion with the drive assembly in the second drive assembly position; and (K) actuation of the locking actuator to move the pivot assembly from the locking elevation to the unlocking elevation when the second frame locking component is aligned with the pivot locking component will unlock the pivot assembly from the frame portion with the drive assembly in the second drive assembly position.

2. The milling machine of claim 1 wherein:

(A) the pivot assembly has a pivot arm, said pivot arm having a ball socket insert and a ball having a central bore;

(B) the positioning actuator is attached to the frame of the milling machine and has a rod with a clevis having holes that are adapted to be aligned with the central bore in the ball;

(C) a pin is placed through the holes in the clevis and the central bore of the ball to secure the rod of the positioning actuator to the pivot arm of the pivot assembly in such a manner as to permit the rod to move to accommodate vertical movement of the pivot assembly on the pivot pin of the frame portion between the locking elevation and the unlocking elevation.

3. The milling machine of claim 1 wherein:

(A) the drive assembly includes an inner tube that is attached to the drive mechanism;

(B) the pivot assembly includes an outer tube that is adapted to receive the inner tube of the drive assembly and to be in sliding engagement therewith;

(C) the elevating actuator moves the drive mechanism, between a contact position on the surface on which the machine is placed for operation and a non-contact position that is off the surface on which the machine is placed for operation, by moving the inner tube of the drive assembly vertically with respect to the outer tube.

4. The milling machine of claim 3 which includes a steering knuckle comprising:

(A) a steering tube that is disposed over and attached to the inner tube of the drive assembly below the outer tube of the pivot assembly, said steering tube being adapted to rotate with respect to the outer tube of the pivot assembly;

(B) a steering arm that is attached to the steering tube;

(C) a steering actuator that is attached between the steering arm and the frame of the milling machine and adapted to rotate the steering tube with respect to the outer tube of the pivot assembly.

5. The milling machine of claim 4 wherein the positioning assembly is configured so that:

(A) when the pivot assembly is locked to the frame portion in the first drive assembly position, the steering actuator cannot be operated to rotate the steering tube with respect to the outer tube of the pivot assembly;

(B) when the pivot assembly is unlocked and the drive assembly is moved between the first drive assembly position and the second drive assembly position, the steering actuator can be used to change the orientation of the drive mechanism as the drive assembly is moved between the first and second drive assembly positions.

6. The milling machine of claim 1 wherein:

(A) the frame portion of the positioning assembly comprises a C-shaped frame portion having an upper frame plate and a lower frame plate;

(B) the pivot pin is mounted between the upper frame plate and the lower frame plate;

(C) the first frame locking component of the frame portion comprises a first positioning boss that is located on the underside of the upper frame plate;

(D) the second frame locking component of the frame portion comprises a second positioning boss that is located on the underside of the upper frame plate;

(E) the pivot assembly comprises an upper pivot plate and a lower pivot plate;

(F) the pivot locking component of the pivot assembly comprises a recess in the upper pivot plate that is adapted to receive the first positioning boss, and alternatively, the second positioning boss;

(G) the positioning actuator is adapted to pivot the pivot assembly on the pivot pin with respect to the frame portion between the first pivot position in which the first positioning boss is aligned with the recess in the upper pivot plate and the second pivot position in which the second positioning boss is aligned with the recess in the upper pivot plate;

(H) the locking actuator is adapted to move the pivot assembly vertically on the pivot pin of the frame portion between the unlocking elevation in which the lower pivot plate is adjacent to the lower frame plate and the locking elevation in which the upper pivot plate is adjacent to the upper frame plate;

wherein the positioning assembly is configured and arranged so that:

(I) the drive assembly is in the first drive assembly position when the first positioning boss is aligned with the recess in the upper pivot plate; and (J) actuation of the locking actuator to move the pivot assembly from the unlocking elevation to the locking elevation when the first positioning boss is aligned with the recess in the upper pivot plate will cause the first positioning boss to be received in the recess in the upper pivot plate and lock the pivot assembly to the frame portion with the drive assembly in the first drive assembly position;

(K) actuation of the locking actuator to move the pivot assembly from the locking elevation to the unlocking elevation when the first positioning boss is aligned with and received in the recess in the upper pivot plate will disengage the first positioning boss from the recess and unlock the pivot assembly from the frame portion with the drive assembly in the first drive assembly position; and (L) the drive assembly is in the second drive assembly position when the second positioning boss is aligned with the recess in the upper pivot plate; and (M) actuation of the locking actuator to move the pivot assembly from the unlocking elevation to the locking elevation when the second positioning boss is aligned with the recess in the upper pivot plate will cause the second positioning boss to be received in the recess in the upper pivot plate and lock the pivot assembly to the frame portion with the drive assembly in the second drive assembly position; and (N) actuation of the locking actuator to move the pivot assembly from the locking elevation to the unlocking elevation when the second positioning boss is aligned with and received in the recess in the upper pivot plate will disengage the second positioning boss from the recess and unlock the pivot assembly from the frame portion with the drive assembly in the second drive assembly position.

7. The milling machine of claim 6 wherein:
(A) the pivot assembly includes a pivot tube that is attached between the upper pivot plate and the lower pivot plate;
(B) the pivot pin extends through the pivot tube.

8. The milling machine of claim 6 wherein:
(A) the drive assembly includes an inner tube that is attached to the drive mechanism;
(B) the pivot assembly includes an outer tube that is:
  (1) adapted to receive the inner tube of the drive assembly and to be in sliding engagement therewith;
  (2) mounted between the lower pivot plate and the upper pivot plate.

9. The milling machine of claim 8 wherein the outer tube of the pivot assembly is mounted so as to extend through the upper pivot plate.

10. A method for moving a drive assembly of a milling machine having a frame and a housing, said drive assembly comprising a drive mechanism with an inner tube attached thereto, between a first drive assembly position which is laterally outside the housing of the milling machine and a second drive assembly position which is laterally within the housing, said method comprising:
(A) providing a positioning assembly for moving the drive assembly between the first drive assembly position and the second drive assembly position, said positioning assembly comprising:
  (1) a frame portion that is attached to the frame, said frame portion comprising:
    (a) a first frame locking component that is associated with the first drive assembly position for the drive assembly;
    (b) a second frame locking component that is associated with the second drive assembly position for the drive assembly;
    (c) a vertical pivot pin;
  (2) a pivot assembly that is pivotally mounted on the pivot pin of the frame portion and is adapted to move vertically on the pivot pin, said pivot assembly further comprising:
    (a) an outer tube that is adapted to receive the inner tube of the drive assembly and to be in sliding engagement therewith;
    (b) an elevating actuator that is adapted to move the drive mechanism, between a contact position on the surface on which the machine is placed for operation and a non-contact position that is off the surface on which the machine is placed for operation, by moving the inner tube of the drive assembly with respect to the outer tube;
    (c) a pivot locking component that is adapted to cooperate with the first frame locking component of the frame portion and alternatively with the second frame locking component of the frame portion;
    (d) a locking actuator that is adapted to move the pivot assembly vertically on the pivot pin of the frame portion between a locking elevation and an unlocking elevation;
  (3) a positioning actuator that is adapted to pivot the pivot assembly on the pivot pin with respect to the frame portion between a first pivot position in which the first frame locking component of the frame portion is aligned with the pivot locking component and a second pivot position in which the second frame locking component is aligned with the pivot locking component;
wherein the positioning assembly is configured and arranged so that:
  (4) the drive assembly is in the first drive assembly position when the first frame locking component is aligned with the pivot locking component; and
  (5) actuation of the locking actuator to move the pivot assembly from the unlocking elevation to the locking elevation when the first frame locking component is aligned with the pivot locking component will lock the pivot assembly to the frame portion with the drive assembly in the first drive assembly position; and
  (6) actuation of the locking actuator to move the pivot assembly from the locking elevation to the unlocking elevation when the first frame locking component is aligned with the pivot locking component will unlock the pivot assembly from the frame portion with the drive assembly in the first drive assembly position; and
  (7) the drive assembly is in the second drive assembly position when the second frame locking component is aligned with the pivot locking component; and
  (8) actuation of the locking actuator to move the pivot assembly from the unlocking elevation to the locking elevation when the second frame locking component is aligned with the pivot locking component will lock the pivot assembly to the frame portion with the drive assembly in the second drive assembly position; and
  (9) actuation of the locking actuator to move the pivot assembly from the locking elevation to the unlocking elevation when the second frame locking component is aligned with the pivot locking component will unlock the pivot assembly from the frame portion with the drive assembly in the second drive assembly position;
(B) actuating the elevating actuator to move the drive mechanism from the contact position to the non-contact position;
(C) actuating the locking actuator to move the pivot assembly to unlock the pivot assembly from the frame portion;
(D) actuating the positioning actuator to pivot the pivot assembly on the pivot pin with respect to the frame portion between the first pivot position and the second pivot position;
(E) actuating the locking actuator to move the pivot assembly to lock the pivot assembly to the frame portion;
(F) actuating the elevating actuator to move the drive mechanism from the non-contact position to the contact position.

\* \* \* \* \*